United States Patent [19]

Bakal et al.

[11] 4,414,229
[45] Nov. 8, 1983

[54] MARGARINE AND THE LIKE SPREAD WITH NATURAL BUTTER FLAVOR

[75] Inventors: Abraham I. Bakal, Parsippany, N.J.; Allen C. Buhler, Racine, Wis.

[73] Assignee: Cumberland Packing Corp., Brooklyn, N.Y.

[21] Appl. No.: 323,548

[22] Filed: Nov. 23, 1981

[51] Int. Cl.$^3$ .................... A23D 3/00; A23L 1/23
[52] U.S. Cl. .................... 426/98; 426/603; 426/613; 426/650
[58] Field of Search .................... 426/63, 98, 533, 35, 426/603, 613, 580, 650, 586

[56] References Cited

U.S. PATENT DOCUMENTS

| | | | |
|---|---|---|---|
| 2,794,743 | 6/1957 | Farnham | 426/63 |
| 3,357,838 | 12/1967 | Noznick | 426/98 |
| 3,393,075 | 7/1968 | Hayashi et al. | 426/98 X |
| 3,469,993 | 9/1969 | Pangier | 426/63 |
| 3,477,853 | 11/1969 | Hull et al. | 426/35 |
| 3,653,921 | 4/1972 | Buhler et al. | 426/580 |
| 4,112,132 | 9/1978 | Badertscher et al. | 426/603 |
| 4,156,021 | 5/1979 | Richardson | 426/604 X |
| 4,273,795 | 6/1981 | Bosco et al. | 426/603 X |

*Primary Examiner*—Robert A. Yoncoskie
*Attorney, Agent, or Firm*—Steinberg & Raskin

[57] ABSTRACT

Margarines or the like spreads are provided with natural butter flavor by incorporating therein oil soluble lipolyzed cream or butter oil (obtained by treating fresh cream with lipase enzymes) and water soluble starter distillate (which is a mixture of flavor compounds distilled from cultured reconstituted skim milk) in an amount sufficient to impart the butter flavor to the spread. The proportion of water soluble component to oil soluble component should be between 1 part water soluble component per each 2–20 parts oil soluble component. It is necessary for the water phase to be distributed throughout the oil phase. This can be accomplished either by mixing the oil and water phases with a carrier such as maltodextrin and drying, which causes the phases to become encapsulated, or by emulsifying the two phases by means of an emulsifying agent.

11 Claims, No Drawings

MARGARINE AND THE LIKE SPREAD WITH NATURAL BUTTER FLAVOR

BACKGROUND OF THE INVENTION

Spreadable emulsions which are used as substitutes for butter have generally become classified according to their oil content. Margarine contains not less than 80% fat as set forth in the standard of identity of the Federal Food, Drug and Cosmetic Act, 21 USC 166.110. The margarine is produced by admixing of two phases, oil and aqueous. The oil blending may be done by the refiner of the margarine manufacturer and color may be added, generally carotene to the oil, as well as vitamins and emulsifiers. About 16-18% skim milk or water, plus flavorants, salt and preservatives are added to the liquid phase. Diet margarine must have 50% or less calories than conventional margarine, and whereas whey or milk powder may be used in margarine for flavor purposes, the same cannot be used in diet margarine because these ingredients have the effect of breaking the emulsion. The diet margarines contain about 60% of water and between about 35-30% of oil.

The so-called "spreads" are between margarine and diet margarine in oil content and thus contain between about 40 and 80% of oil.

The term "margarine or the like spreads" used throughout the specification and claims of this case is meant to include all of the above butter substitute spreads, namely margarine, diet margarines and "spreads" as well as butter itself since the composition of the invention can even be added to butter to intensify the butter flavor.

Margarine itself, while it can be made so as to be substantially cholesterol-free, nevertheless contains substantially the same number of calories as does butter. Also, margarine has never been able to achieve the same desired flavor as natural butter.

The diet margarines, and the "spreads" which are generally sold in plastic tubs, while having less calories then margarine, are even less desirable than margarine from the standpoint of taste and mouth feel.

All of the margarine and the like spreads on the market utilize the artificial ingredient diacetyl to attempt to impart a buttery flavor to the spread. Some of the margarine products utilize a blend of diacetyl with butyl aldehydes, butyl alcohols and butyric acid.

Starter distillate was experimented with for the purpose of imparting flavor to margarine but was found when used alone for this purpose to be too fragile with loss of flavor occurring very shortly after the product was packaged.

Likewise, lipolyzed cream was tried as a flavorant for margarine but was found when used alone for this purpose to be unsatisfactory because the product was not stable and would become rancid within thirty days. In addition, the flavor was too inconsistent from batch to batch and there was considerable difficulty in maintaining a good emulsion with these flavorants.

SUMMARY OF THE INVENTION

It is accordingly a primary object of the present invention to provide margarine or the like spreads with natural butter flavor.

It is another object of the present invention to provide a composition of water soluble distillate and oil soluble lipolyzed cream which can be added to any margarine or the like spread to impart natural butter flavor thereto.

It is yet another object of the present invention to provide a method of incorporating the composition of the invention into margarines or the like spreads for the purpose of imparting natural butter flavor thereto. An additional object is to impart such flavor which is maintained in a stable water-in-oil emulsion.

It is still a further object of the present invention to provide for a means of giving natural butter flavor to any spread, and in fact to even intensify the natural butter flavor of butter itself.

With the above and other objects in view, the present invention mainly comprises as a natural butter flavorant for margarines or the like spreads, a mixture of water soluble starter distillate with oil soluble lipolyzed creams or lipolyzed butter oils in a ratio of 2-20 parts of the oil soluble component per each part of the water soluble component, and preferably 5-10 parts of the oil soluble component per each part of the water soluble component.

The use of more than 20 parts of the oil soluble component gives the composition a flavor which is to cheesy. On the other hand, the use of less than 2 parts of the oil soluble component results in a product having an imbalance of flavor notes and not a true natural butter taste.

The margarine or the like spread of the present invention possessing natural butter flavor comprises margarine or the like spread with the addition thereto of 0.05-2% by weight of the above flavorant. While this proportion is not critical it has been found that an addition of less than 0.05% of the flavorant is too weak to accomplish the desired result. On the other hand, while more than 2% of the flavorant can be used, any additional amount is unnecessary and therefore should be avoided from the standpoint of economy.

If desired, the margarine or the like spread can also include cellulose fiber in an amount of up to 3% of the water content, the cellulose fibers having a particle size preferably in the range of not greater than 400 microns, and more preferably in the range of 50-200 microns. A particle size of more than 400 microns gives the spread a texture which is too gritty or stringy.

The amount of cellulose fiber depends to a large extent on the amount of water in the spread. Spreads having about 15% of water require no cellulose fibers or at most a very small amount, while spreads having a high water content of up to 60% require higher cellulose fiber content in a range of about 0.05-3% of the water content. If less than 0.05% cellulose fiber is used in such spread, the amount of fiber is not sufficient to provide the desired texture for good spreadability. On the other hand, an amount of more than 3% makes the product too stiff and therefore loses spreadability. The higher percentage is used for higher water contents. When used at the preferred levels, the cellulose fibers serve as non-caloric moisture binders and improve the texture and mouthfeel of the spread. The cellulose fibers also improve the flavor impact in spreads having a high water content.

In accordance with a preferred embodiment of the present invention, the water soluble starter distillate and oil soluble lipolyzed oils are both spray dried and in this dry form mixed with the aqueous phase from which the water-in oil emulsion of the margarine or the like spread is made. The water soluble coating of the spray dried material envelopes the lipolyzed oil and thus facilitates distribution thereof in the aqueous phase so that this method of incorporating the flavoring component of the invention results in uniform, stable emulsions which are not readily produced when the lipolyzed oils or creams are used in a liquid form. The water soluble coating or carrier may be a conventional carrier such as non-fat dry milk, starches, corn syrup solids or maltodextrins. We have found that starch hydrolysates having a lower dextrose equivalent are particularly suitable since they are readily water soluble and not too hygroscopic. When the DE is 20 or less, such carriers are referred to as maltodextrins.

The lipolyzed oils or creams are natural dairy flavors and can be obtained by incubating either milkfat, derived directly from whole milk, or butter oil derived from butter with a lipase (esterase) enzyme as described, for example, in U.S. Pat. No. 2,794,743. During the incubation period, the enzyme system catalytically releases fatty acids from the butter fat and results in certain end products. Specific action of the lipase system releases volatile, flavorful, fatty acids including butyric, caproic, and caprylic capric acids, in much greater molar concentrations than, but together with, long chain fatty acids. To control the flavor development in the finished product, the system is heated to completely destroy the enzyme activity and to reduce the bacterial counts to very low levels. Lipolyzed cream or milk fat can be likewise produced in the manner described in U.S. Pat. No. 3,469,993, i.e., by first treating with lactic acid-producing bacteria to produce therein lactic acid, after which the lactic acid acidified milk fat medium is treated with lipase enzymes in the conventional manner.

The starter distillate, which is the water soluble component of the flavorant of the present invention is the mixture of flavor compounds distilled from cultured reconstituted skim milk. It contains the flavor compounds which are volatile with water at 212° F. While the major component of starter distillate is ciacetyl, the starter distillate as a whole, however, gives a flavor which is much more pleasant than that of synthetic diacetyl because of the presence of other flavor substances produced by the bacteria used in culturing the milk. Starter distillate is obtainable commercially as "starter distillate."

The use of the flavorant of the present invention particularly when incorporated into the margarine or the like spread by mixing the spray dried flavorant with the aqueous phase of what becomes the margarine or the like spread, in an amount of 0.05-2% of the spread, results in a margarine or the like spread with a truly natural butter flavor.

In order to achieve a natural butter flavor, the spread must have a butter flavor which is free of artificial and off-flavor notes. The flavor must be homogeneously distributed within the emulsion and yet must be available to the taste buds during consumption. Still further, the flavor must also be stable upon storage of this spread under refrigeration for periods of up to six months and must be stable upon heating and during processing.

In contrast to known attempts to achieve natural butter flavor in margarine or the like spreads, such attempts even going to the extent of mixing natural butter with margarine, which is both expensive and cannot provide for cholesterol free products, the compositions of the present invention provide truly natural butter flavor from natural sources. The flavor system is stable under refrigeration for at least six months in the presence of preservatives and anti oxidants which are commonly used in margarine and the like spreads. Still further, the flavor system of the present invention is adapted for incorporation into diet margarines of high water content.

The method of the present invention comprises the mixing of the water soluble starter distillate with the oil soluble lipolyzed oil, in a ratio of 1 part of water soluble component to 2–20 parts of oil soluble component (preferably 5–10 parts), together with other additives, such as, water, maltodextrin or other carriers and color if desired. If the flavor base is to be used with low calorie spreads of high water content, then cellulose fiber of a particle size of 50–400 microns is added in an amount such that the cellulose content in the final product is between 0.5–3% of the water content of the final spread. The mixture is then dried. Drying can be effected by freeze drying, foam-mat drying, rotary drying, tray drying or spray drying. Spray drying is most preferred.

It has been found that the drying step imparts certain benefits to the final product in that certain volatile and undesired flavor notes are eliminated during the drying step. The resulting flavor base becomes shelf stable and does not change upon storage and still further the flavor base can be more easily incorporated into the spread since it can be mixed into the water phase of the spread and thoroughly emulsified therewith before being added to the fat phase.

The water phase can also be distributed through the oil phase by emulsification with any of the common commercial emulsifying agents such as the Tweens, the Spans or lecithin, to form a paste which paste can also be used for the purposes of the present invention.

DESCRIPTION OF THE PREFERRED EMBODIMENTS

The following examples are given to further illustrate the present invention. The scope of the invention is not, however, meant to be limited to the specific details of the examples.

EXAMPLE 1

30 parts of Dariteen L-11 (A commercial lipolyzed cultured cream manufactured by Haarmann & Reimer) were mixed with 3.0 parts starter distillate, 0.2 parts annatto coloring, 0.02 parts turmeric and 66.78 parts maltodextrin. To this mixture about 50 parts of hot water were added and the mixture was thoroughly agitated and homogenized. This mixture yielded a homogeneous emulsion in which the two flavor components, the oil soluble and the water soluble, were uniformly dispersed. This mixture was kept under refrigeration in order to minimize changes in the flavor during storage. However, this flavor system was unstable and had limited storage life.

Because of the lack of drying the above flavor system is unstable, as indicated. However, the flavor system will give a satisfactory flavor provided that it is used fresh.

EXAMPLE 2

To 150 parts of the flavor system described in Example 1, 50 parts of hot water were added. The flavor was then thoroughly mixed and homogenized.

The homogeneous mixture was spray dried in a conventional spray drier.

The dehydrated product contained the functional ingredients, that is the lipolyzed cultured cream and the starter distillate, enrobed in the maltodextrin. This flavor system was stable and could be stored for long periods without noticeable change in the flavor.

In this dehydrated system, the ratio of the oil soluble flavor component to the water soluble was 10.0 to 1.0 respectively.

This example describes a preferred flavor system giving excellent flavor notes and providing a stable product which can be used over long periods of time.

EXAMPLE 3

Thirty parts of Dariteen L-11 were mixed with 3.0 parts of starter distillate, 0.2 parts annatto coloring and 0.02 parts turmeric. The mixture was heated to about 150° F. and to it 17 parts of water were added. To this mixture 0.05 of Tween 60 and 0.05 parts of Span 60 (as emulsifiers) were added and the mixture was homogenized to produce a uniform emulsion. This emulsion could be used as the flavor base having about 1.5 times the flavor strength of the flavor base described in Example 2.

EXAMPLE 4

To 295 parts of water, 75 parts of the flavor base described in Example 2, and 30 parts of salt were added and thoroughly mixed. A uniform mix was obtained.

This mixture was combined with 1,600 parts of margarine oil (containing emulsifiers, and preservatives) and then passed through a cool scraped surface heat exchanger in the normal manner margarines are prepared.

The product was poured into tubs to form a soft margarine spread.

The product was subjected to a taste panel and was compared to commercial margarines and lightly salted butter. The panel was asked to rate the flavor of each product on a scale of 0 to 8 where:

0 = not butter-like flavor
8 = truly butter-like flavor.

The butter was given to the panel as open control and to it a score of 8 was assigned. The panel gave the product made in accordance with this invention an average score of 7.0, while giving the commercial margarine products an average score of 5.5.

EXAMPLE 5

The product prepared in accordance with Example 4 was stored under refrigeration for six months and evaluated.

No changes were noted in flavor, color or stability of the product.

The product still received high scores by the taste panel.

EXAMPLE 6

To 200 parts of the flavor base described in Example 2, 50 parts of microcrystalline cellulose, 50 microns were added and thoroughly mixed.

This mixture was added to 970 parts of water and 30 parts of salt and thoroughly mixed to produce a homogeneous dispersion. To this 750 parts of margarine oil (containing emulsifiers and preservatives) are added, thoroughly mixed to form an emulsion and cooled in a scraped surface heat exchanger in the normal manner for preparing diet margarines.

The product was poured into tubs to form a soft diet margarine spread.

The product was evaluated and judged superior to commercial diet margarines. Panelists described this product as having a true butter flavor and having desirable mouthfeel. The commercial diet margarines were judged as gummy or slimy and as having a chemical flavor.

This product was judged as acceptable even after four months of refrigerated storage.

EXAMPLE 7

To 150 parts of the flavor base described in Example 2, 40 parts of cellulose (50 micron) and 30 parts of salt were added and thoroughly mixed. This mixture was added to 480 parts of water and thoroughly mixed to form a homogeneous product. This homogeneous emulsion was chilled and added to 1,300 parts of butter (without salt) and whipped in a mixer. Whipping was continued until a uniform product was obtained.

The resulting product was a whipped butter having less than one-third the calories of butter and excellent butter flavor. This product was compared to commercial whipped butter and was judged as having better butter flavor than the commercial whipped butter.

EXAMPLE 8

To 100 parts of the flavor base described in Example 2, and 30 parts of salt, 700 parts of water were added and the mixture was thoroughly blended. This mixture was combined with 1,170 parts of margarine oil (containing emulsifiers and preservatives) and then passed through a cool, scraped surface heat exchanger in the normal manner margarines are prepared.

The product was poured into tubs to form a soft, light spread.

The product was subjected to a taste panel and was compared to commercial light spreads. It was judged superior to the commercial light spread in flavor and mouthfeel. The panel described the flavor as clean, true butter flavor.

This product was judged as acceptable even after four months of refrigerated storage.

EXAMPLE 9

To 1 part of the flavor base mentioned in Example 2, about 0.2 parts of water were added and the mixture was homogenized. This mixture was then added to 98.8 parts of commercial, slightly salted butter and mixed thoroughly to produce a uniform product.

This product was evaluated by a taste panel for flavor quality and was compared with commercial butter.

It was found that this product had approximately double the flavor strength of the commercial butter. The panel described the flavor of the product as clean, true butter flavor with no aftertaste.

This method clearly illustrates the potential of this invention in cost savings and/or caloric savings in various food applications. For example, the product described in this example could replace twice the quantity of butter in a cake. This will represent substantial cost savings, as well as caloric reduction.

Another possibility is to mix this double flavor strength butter with equal quantity of margarine and thus obtain a butter/margarine blend having the flavor of commercial butter at significantly lower cost.

EXAMPLE 10

To 1.5 parts of the flavor base described in Example 2, 0.3 parts of water were added. This mixture was thoroughly blended and homogenized.

This paste was added to commercial, slightly salted, whipped butter and mixed thoroughly to produce a uniform product.

The product was judged as having strong, clear and true butter flavor. It could be used commercially, for example, as a pancake topping with noticeably improved flavor.

While the invention has been described with particular reference to certain specific embodiments, it is to be understood that various modifications and changes may be made and such modifications are contemplated and are to be considered within the scope of the appended claims.

What is claimed is:

1. Composition for providing natural butter flavor to a butter substitute spread, said composition comprising as a water soluble component starter distillate which is uniformly distributed through lipolyzed cream or lipolyzed butter oil as an oil soluble component in ratio of 2–20 parts of said oil soluble component per each part of said water soluble component.

2. Composition according to claim 1 wherein said oil of soluble component is present in an amount of 5–10 parts for each part of said water soluble component.

3. A butter substitute spread possessing natural butter flavor, said spread having distributed therethrough between about 0.05–2% by weight of the composition of claim 2.

4. Spread according to claim 3 and also including cellulose fibers having a particle size not greater than about 400 microns in an amount of up to 3% of the water content of said spread.

5. Spread according to claim 4 and wherein the particle size of said cellulose fibers is between about 50 and 200 microns.

6. Composition according to claim 1 and also including a carrier.

7. Composition according to claim 6 wherein said carrier is selected from the group consisting of non-fat dry milk, starches, corn syrup solids and maltodextrins.

8. Composition according to claim 6 wherein said carrier is maltodextrin.

9. Method of producing the composition of claim 6, which comprises mixing said water soluble component, said oil soluble component and said carrier, and drying the thus formed mixture, thus causing the oil and water soluble components to become encapsulated.

10. Method according to claim 9 wherein the drying is effected by spray drying.

11. Method of producing the spread of claim 3, which comprises drying said water soluble component and said oil soluble component, and mixing the thus dried components with an aqueous phase from which the margarine or the like spread is made, thus distributing said components therein.

* * * * *